C. A. JUDD.
Weather-Strips.
No. 155,957.             Patented Oct. 13, 1874.
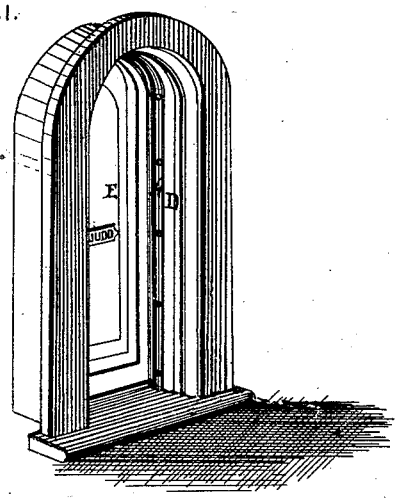
FIG. I.
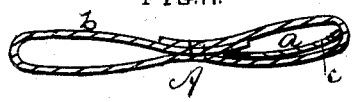
FIG. II.
FIG. III.
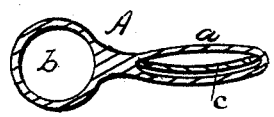
FIG. IV.
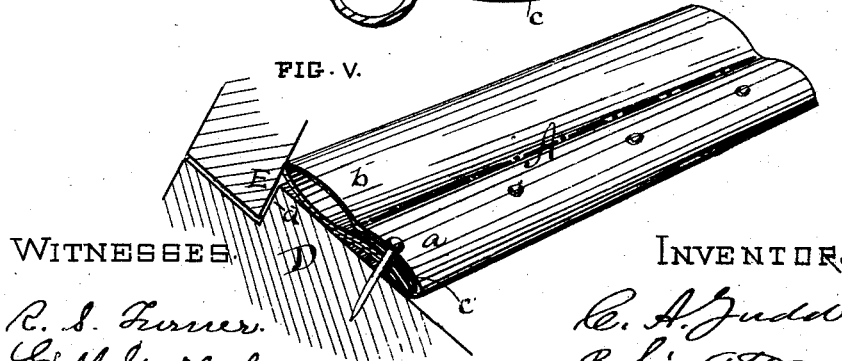
FIG. V.

UNITED STATES PATENT OFFICE.

CHARLES A. JUDD, OF MILWAUKEE, WISCONSIN.

IMPROVEMENT IN WEATHER-STRIPS.

Specification forming part of Letters Patent No. 155,957, dated October 13, 1874; application filed September 16, 1874.

*To all whom it may concern:*

Be it known that I, C. A. JUDD, of Milwaukee, in the county of Milwaukee and State of Wisconsin, have invented a new and useful Improvement in Weather - Strip; and I do hereby declare the following to be a full, clear, and exact description of the same, reference being had to the accompanying drawings, in which—

Figure 1 is a perspective view of a door with my weather-strip attached. Figs. 2, 3, and 4 are transverse sections, showing different methods of construction. Fig. 5 is a perspective section, showing my weather-strip in operative position.

This invention relates to that class of weather-strips which combine a rigid portion to form the medium of secure attachment to the door-casing or other surface, and an elastic portion which covers the crevice which is desired to close, having for its object the exclusion of cold, wind, rain, snow, dust, &c.; and it consists of a rigid strip inclosed in a loop formed by folding one edge of a strip of elastic material, the other edge of elastic material being folded back upon the first, in such a manner as to form a cushion upon the side so folded.

In practice, I employ a double tube, made from a strip of rubber cloth or other elastic material, the two edges of which are folded inwardly upon the center, and secured there, and a strip of metal or other rigid material inserted within one of said tubes, whereby is produced, first, a weather-strip the entire exterior surface of which is composed of the elastic material; and, second, an elastic weather-strip having a rigid core, to insure a secure fastening to the casing or other surface, when applied.

That others may understand my invention, I will more particularly describe it.

For convenience, I will only describe my weather - strip as I prefer to construct it, although it can be made by molding the rubber before vulcanization, and inserting the rigid strip afterward; or the rigid strip could be molded in the rubber before vulcanization.

A is the weather-strip, formed of the double tube $a\,b$, of rubber or other elastic material, inclosing in the tube $a$ a strip of metal or other rigid material, $c$.

In application, the fastening screws or nails are driven through the tube $a$ and strip $c$ into the surface to which the strip is attached; and for the purpose of securing a close contact with said surface in the intervening space between the said fastening nails or screws, as well as to make the weather-strip stiff, to bear handling and transportation, and to improve its general appearance, I corrugate the metallic strip $c$ lengthwise, as shown.

When secured in place—as, for instance, to exclude cold, rain, wind, &c., from the crevice around a door—the strip A may be nailed fast to the casing D, as shown in Figs. 1 and 5, so that the tube $b$ covers the crevice $d$, and rests against the surface of the door E.

For this purpose the tube is much to be preferred to a tongue or single edge of elastic material, as shown in Fig. 3, because it is much more flexible, and will conform to slight inequalities of surface to which the single edge will not.

I prefer to manufacture this weather-strip, generally, from strips of rubber cloth or packing, (technically called gum packing,) cut to proper width. The edges of this strip are folded together so as to overlap, and are secured by sewing through said lap and through the center, or nearly so, of the strip, thus forming the double tube $a\,b$, as shown in Figs. 2 and 5. This folding and sewing is accomplished automatically by proper machinery, and the metallic strip may be inserted at the same operation, *i. e.*, before the sewing. Cement may also be employed to fasten, instead of sewing.

The advantages of this weather - strip are, first, cheapness; second, small size and great elasticity, combined with requisite stability, insured by the rigid cone; third, adaptability to any space or position where an elastic strip may be required.

A wooden molding may be used to cover and hide the weather-strip, if desired; but nothing of that sort will be required for its protection.

Having described my invention, what I claim as new is—

A weather-strip, constructed with a rigid strip or core inclosed within an elastic covering, and a loop or cushion of said elastic material along one edge, substantially as set forth.

CHAS. A. JUDD.

Witnesses:
JAMES I. THOMPSON,
GEO. B. GOODING.